Dec. 3, 1963 R. E. HERSEY 3,113,184

TELEPHONE SYSTEM

Filed Aug. 31, 1960 8 Sheets-Sheet 1

INVENTOR
R. E. HERSEY
BY
ATTORNEY

Dec. 3, 1963 R. E. HERSEY 3,113,184
TELEPHONE SYSTEM
Filed Aug. 31, 1960 8 Sheets-Sheet 2

INVENTOR
R. E. HERSEY
BY [signature]
ATTORNEY

Dec. 3, 1963 R. E. HERSEY 3,113,184

TELEPHONE SYSTEM

Filed Aug. 31, 1960 8 Sheets-Sheet 3

INVENTOR
R. E. HERSEY
BY [signature]
ATTORNEY

Dec. 3, 1963 R. E. HERSEY 3,113,184

TELEPHONE SYSTEM

Filed Aug. 31, 1960 8 Sheets-Sheet 4

INVENTOR
R. E. HERSEY
BY [signature]
ATTORNEY

Dec. 3, 1963 R. E. HERSEY 3,113,184

TELEPHONE SYSTEM

Filed Aug. 31, 1960 8 Sheets-Sheet 5

INVENTOR
R.E. HERSEY
BY [signature]
ATTORNEY

Dec. 3, 1963 R. E. HERSEY 3,113,184

TELEPHONE SYSTEM

Filed Aug. 31, 1960 8 Sheets-Sheet 6

INVENTOR
R. E. HERSEY
BY [signature]
ATTORNEY

Dec. 3, 1963 R. E. HERSEY 3,113,184

TELEPHONE SYSTEM

Filed Aug. 31, 1960 8 Sheets-Sheet 7

INVENTOR
R. E. HERSEY
BY [signature]
ATTORNEY

INVENTOR
R. E. HERSEY
BY [signature]
ATTORNEY

United States Patent Office
3,113,184
Patented Dec. 3, 1963

3,113,184
TELEPHONE SYSTEM

Ralph E. Hersey, Denville, N.J., assignor to Bell Telephone Laboratories, Incorporated, New York, N.Y., a corporation of New York Filed Aug. 31, 1960, Ser. No. 53,188
15 Claims. (Cl. 179—18)

Figure 1A:
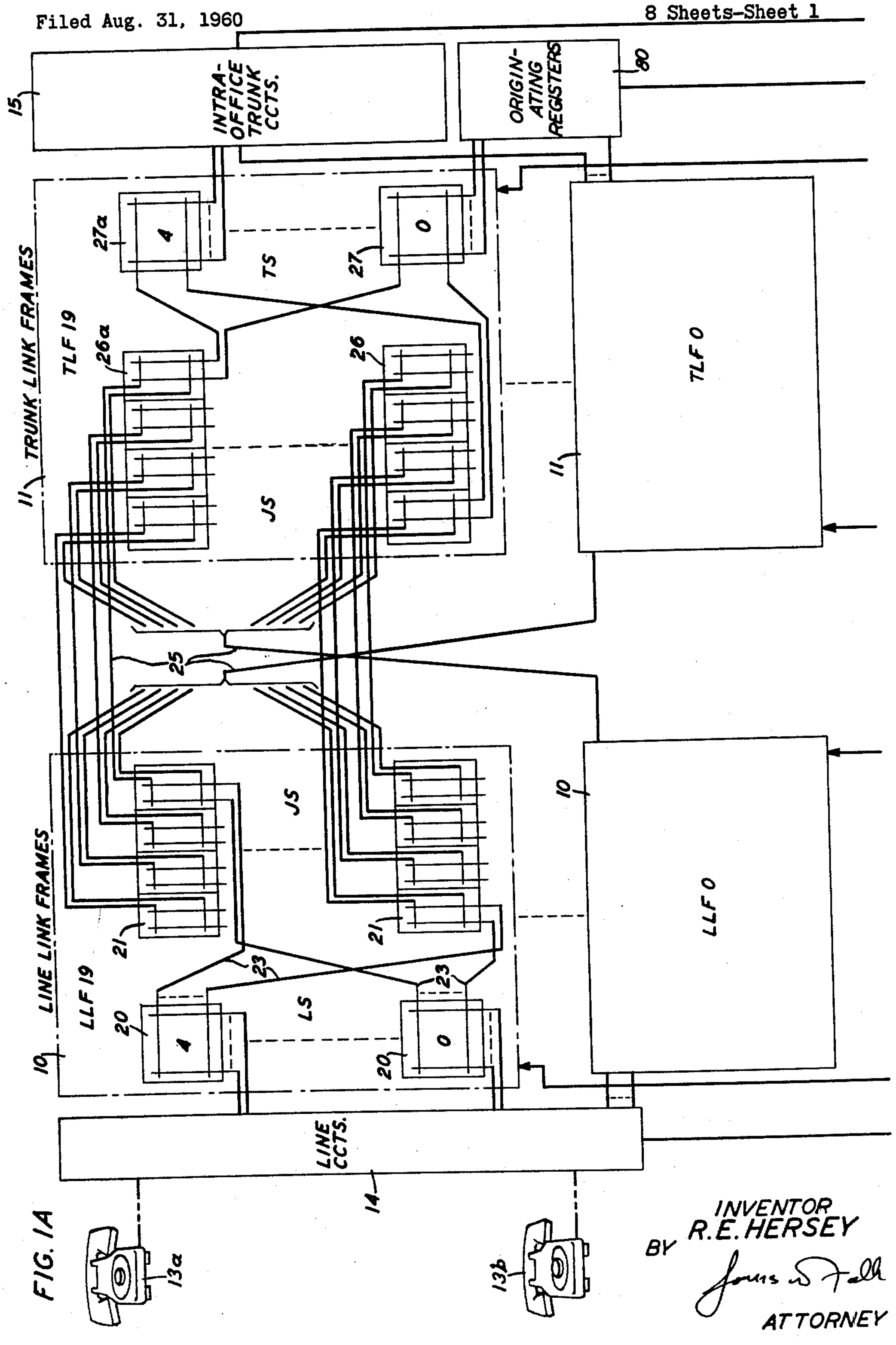

This invention relates to telephone communication systems and more particularly to such a system employing electromechanical crossbar switches for establishing the desired communication paths under the control of electronic central control equipment.

Various types of telephone communication systems have been developed possessing various advantages in operation. Reliability is an essential feature of any telephone communication system. Most telephone systems in commercial use today depend upon metallic contacts, both for control and in the communication paths between subscribers, to provide this requisite reliability. One such system which attains this advantage with improved speed of operation and simplicity of path selection utilizes electromechanical switches of the crossbar type which permit selection of a particular contact pair out of a multiplicity of contacts in a matrix configuration by energizing pairs of coordinate control leads. However, the speed of operation of the control circuitry associated with the crossbar switches is still limited by the response time of the mechanical members comprising the switches.

Switching systems utilizing electronic components such as semiconductor devices in place of the metallic contacts described above have been developed to increase the speed of operation and thereby decrease the utilization time of the associated control equipment. Such electronic switching systems employ central control equipment which is designed to function in considerably less time than the inherent response time of the above-described electromechanical devices. Accordingly, arrangements which provide compatibility between the two classes of equipment so that the electronic central control equipment may be employed to control a network of electromechanical crossbar switches would be particularly advantageous.

It is, therefore, a general object of this invention to provide an improved telephone communication system.

More specifically, it is an object of this invention to provide control of an electromechanical crossbar switching network by electronic central control equipment.

A further object of this invention is to combine the reliability of metallic contact switching elements with the high speed of operation of electronic control circuitry.

In accordance with an aspect of my invention it is an object thereof to increase the number of connections which may be served by an individual crossbar switch.

One specific embodiment of my invention comprises a plurality of electromechanical crossbar switches interconnected to form a telephone switching network for providing predetermined communication paths between telephone subscribers. These crossbar switches are interconnected in accordance with an aspect of my invention which will be described in greater detail hereinbelow to provide twenty input and twenty output leads in what is ordinarily considered a ten-by-twenty switch structure. Electronic central control equipment of the type described in "A Central Control for ESS" by G. G. Drew, vol. 38, No. 2, Bell Laboratories Record, page 49, and in Patent 2,955,165, issued October 4, 1960, of Budlong, Drew, and Harr, is associated with the crossbar switches of the switching network.

In accordance with my invention, the crossbar switches arranged in a particular group within the network are controlled by buffer relays which receive their own control signals from a plurality of leads in common bus systems connected to the central control equipment. Under the control of this equipment, particular gating relays are energized to connect the selected buffer relays to the control bus leads. Once the buffer relays respond to the signals applied to the bus leads, the associated gating relays are released, and the specified connection within the selected crossbar switch is completed under the direct control of the buffer relays. Meanwhile the common bus leads are free to carry control signals to other portions of the switching network. When the specified connection is established, these buffer relays release themselves and are then ready to control another connection within their associated crossbar switch group.

The specific embodiment of my invention disclosed herein depicts an arrangement for establishing connections between a pair of telephone subscribers connected to the same central office and is merely representative of other arrangements which may be employed for providing connections between telephone subscribers of different offices. It will be clear to those skilled in the art that other arrangements as, for example, changing the trunk circuits serving a particular switching network may be employed in the practice of the instant invention without exceeding the scope thereof.

It is a feature of this invention to employ a plurality of relays for storing control signals for a group of electromechanical crossbar switches in a temporary storage stage between these switches and electronic central control equipment.

It is a further feature of this invention to provide selectively operated gating relays controlled by electronic central control equipment for connecting the above-mentioned intermediate storage relays to common bus leads carrying the control signals for the associated electromechanical crossbar switches.

It is a further feature of this invention to provide, in a telephone system in accordance with my invention and having temporary storage buffer relays for relaying signals from central control equipment to a crossbar switching network, for the disconnection of the buffer relays from the common bus leads once the signals from the central control equipment to select the particular crossbar switch contacts have been stored in the buffer relays.

It is an additional feature of this invention to restore the quiescent states of the temporary storage buffer relays of such a telephone system and to provide an indication of such a restoration to the central control equipment upon the establishment of the desired contact condition of the selected crossbar switch in response to signals originating in the central control equipment.

A still further feature of this invention is the use of magnetically latching crossbar switches in a telephone system employing temporary storage buffer relays for relaying signals from central control equipment to preselected crossbar switches of the type described.

Figure 1B:
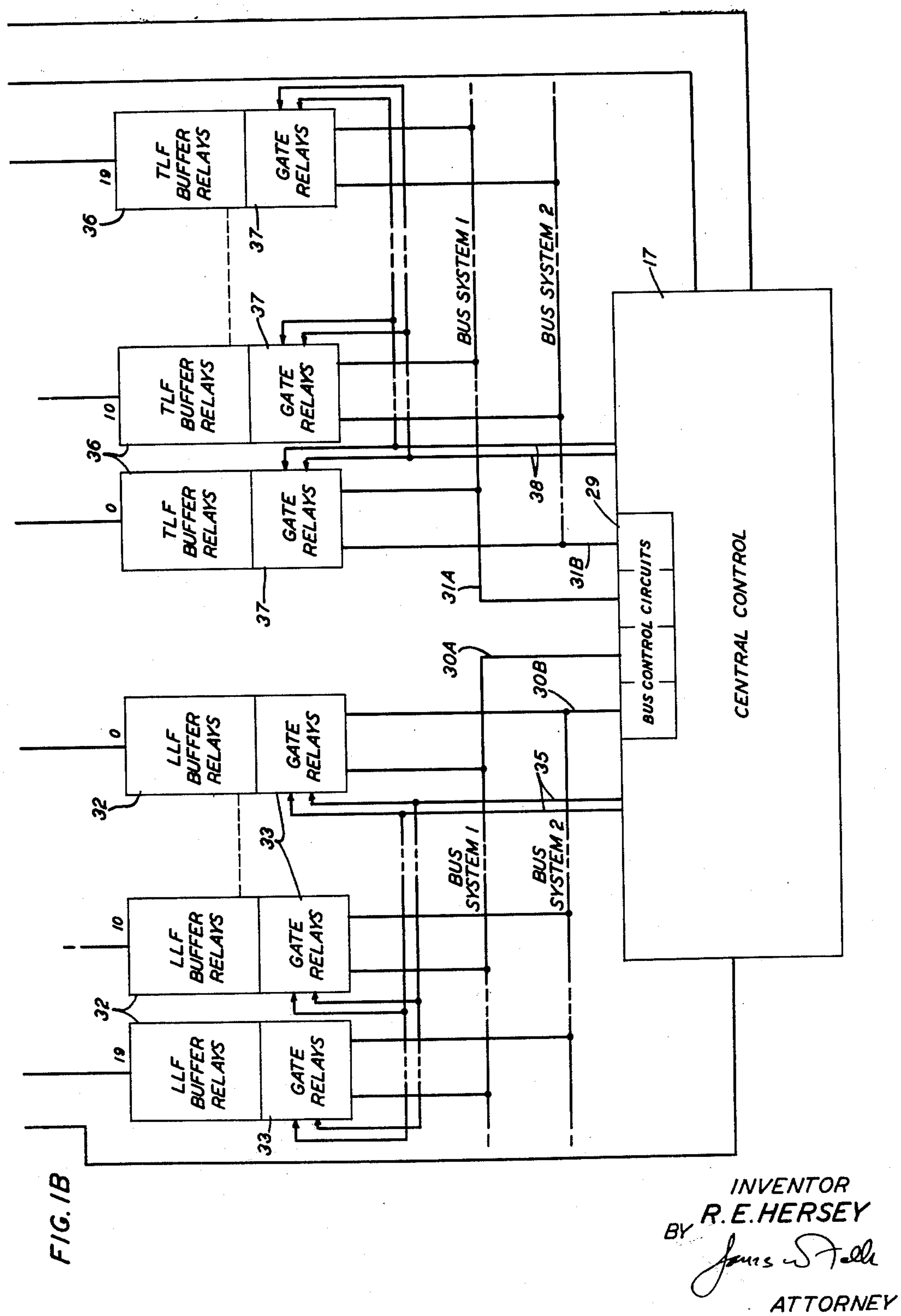
Figure 2:
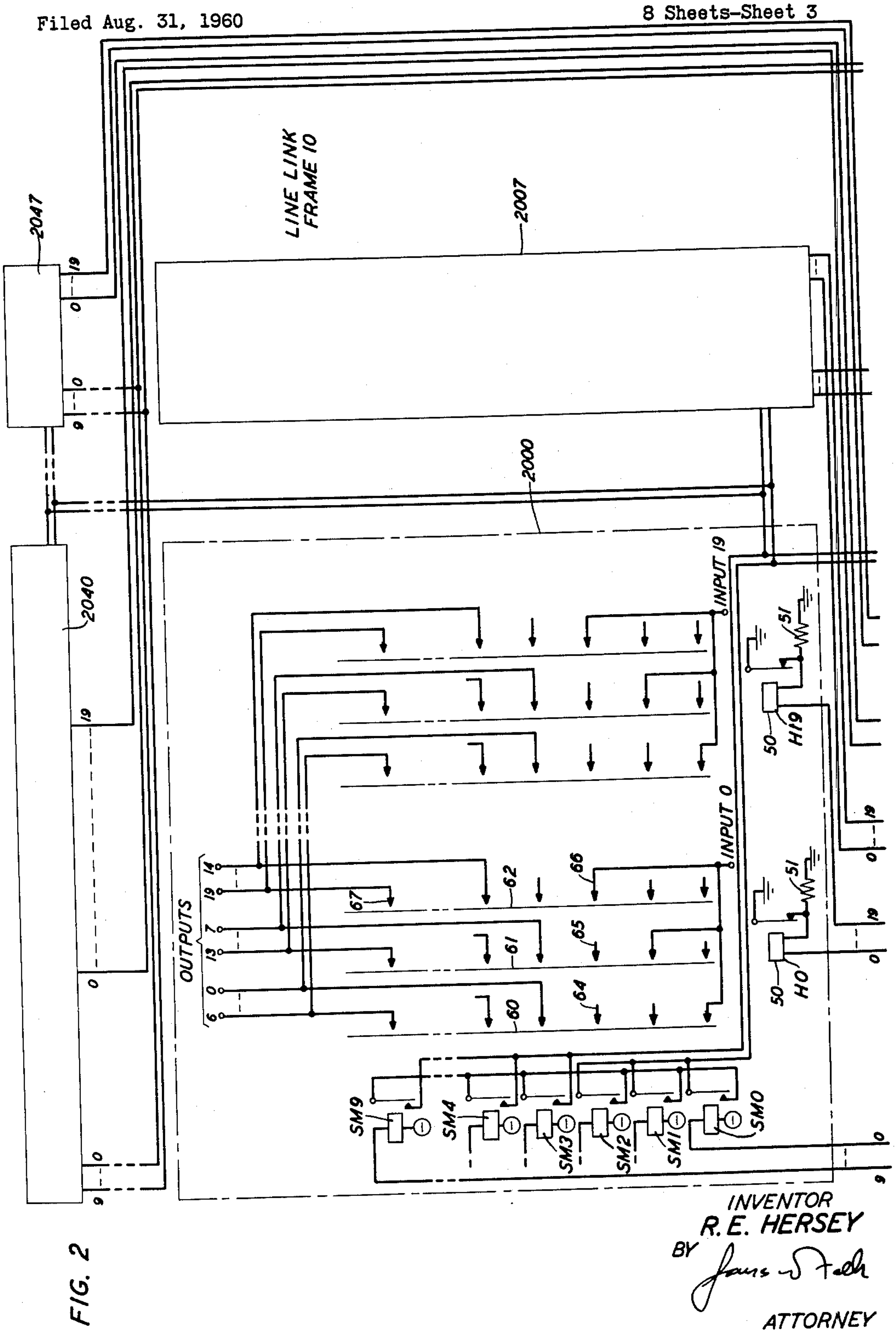
Figure 3:
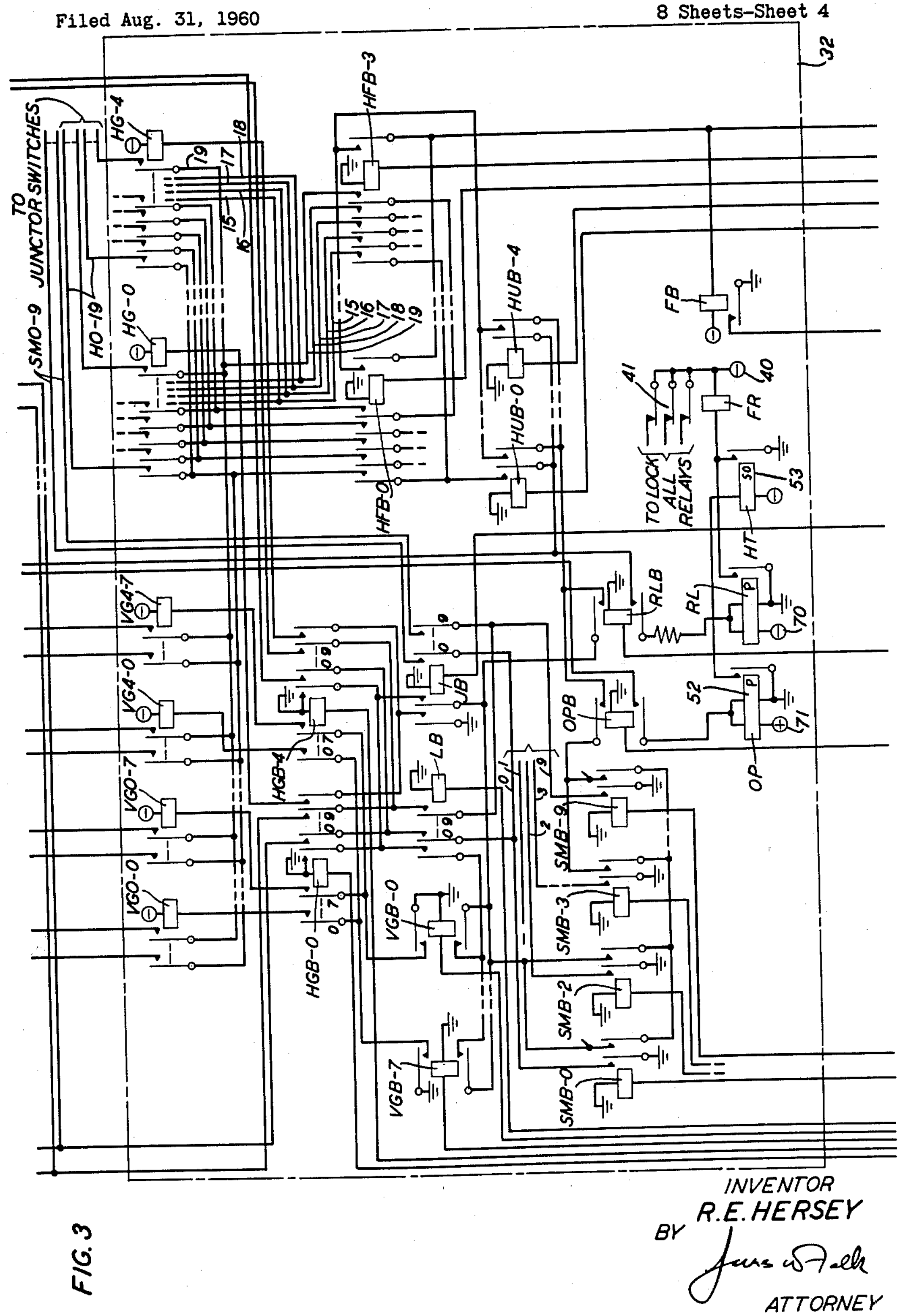
Figure 4:
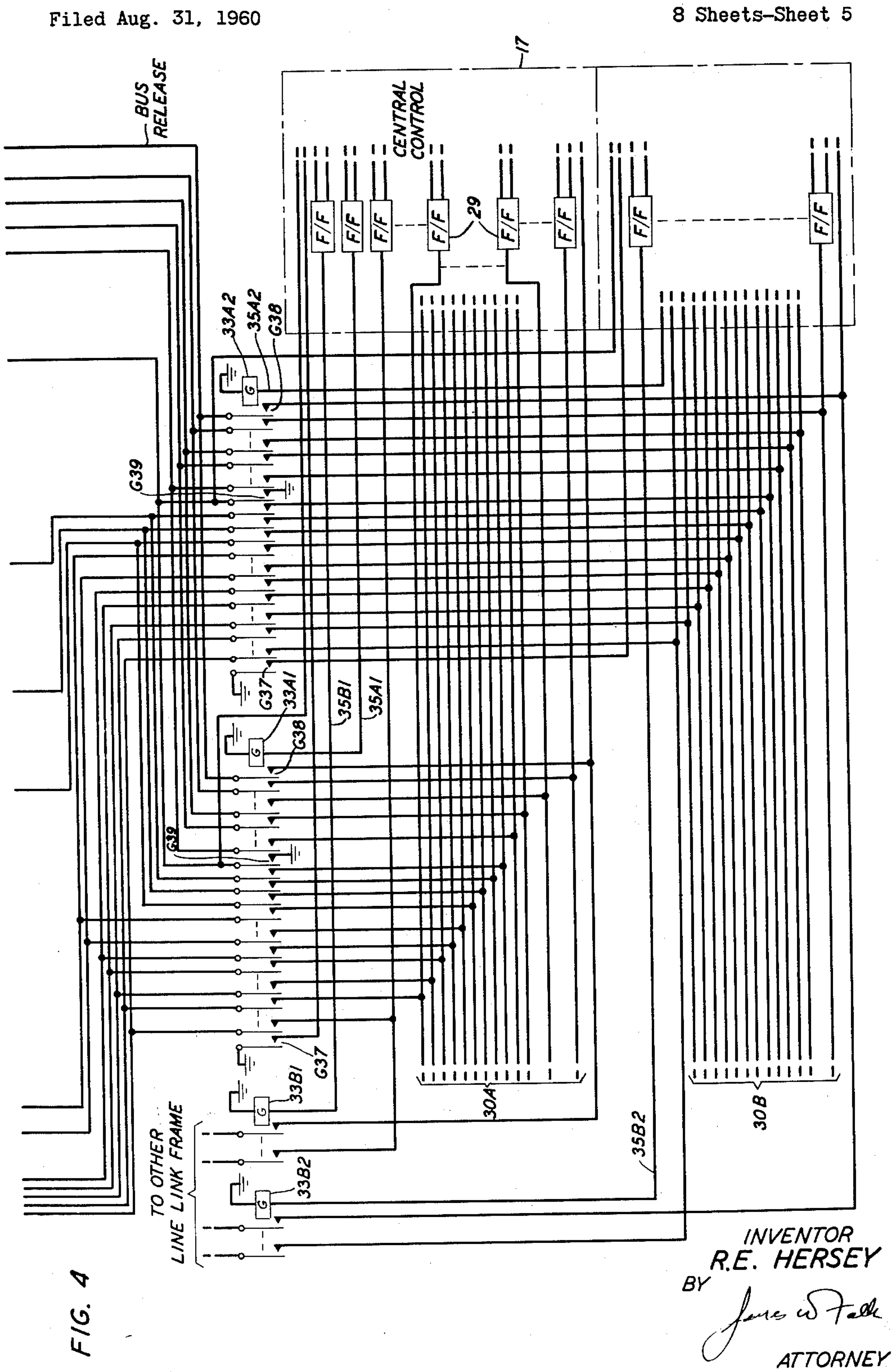
Figure 5:
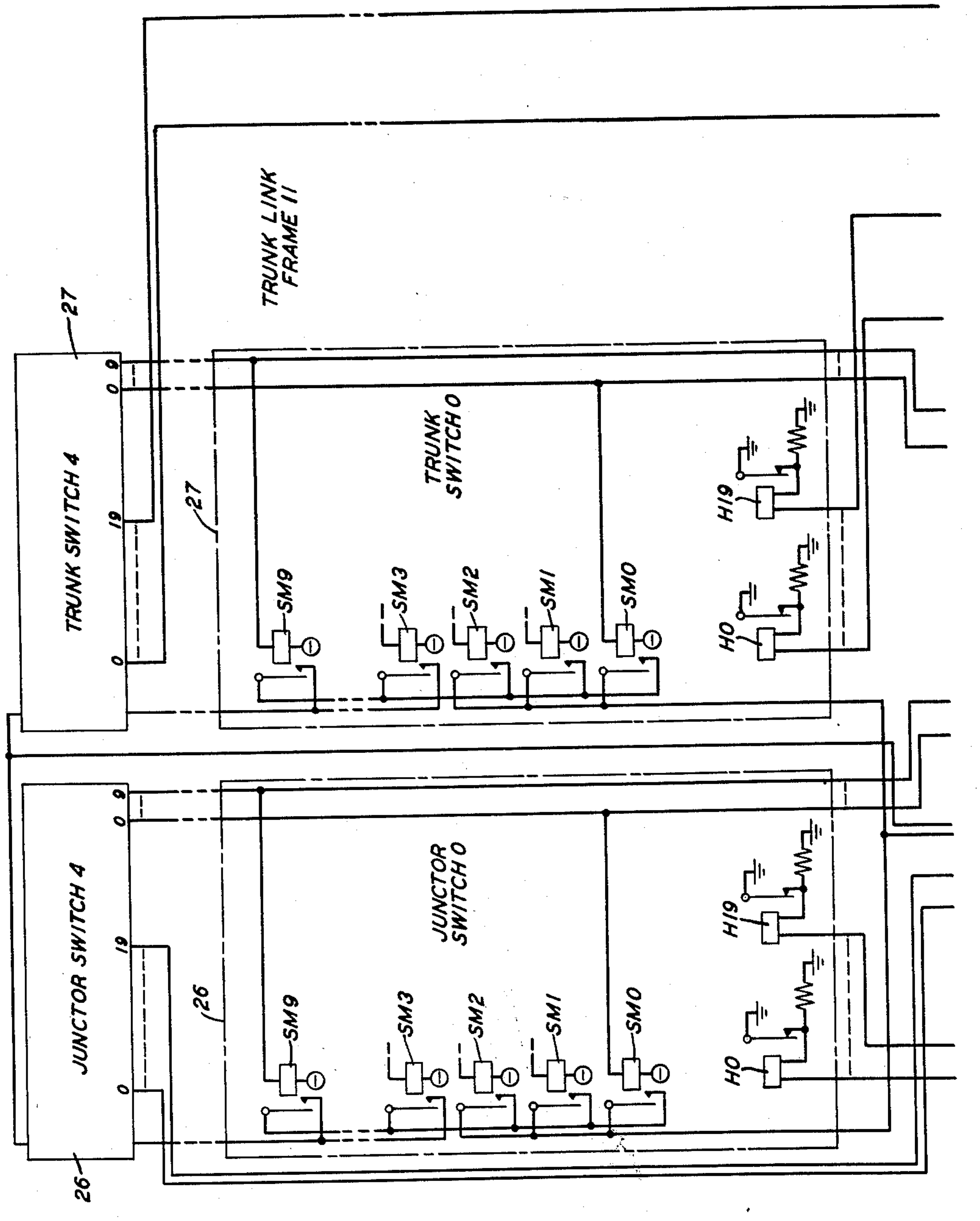
Figures 7, 8, 9:
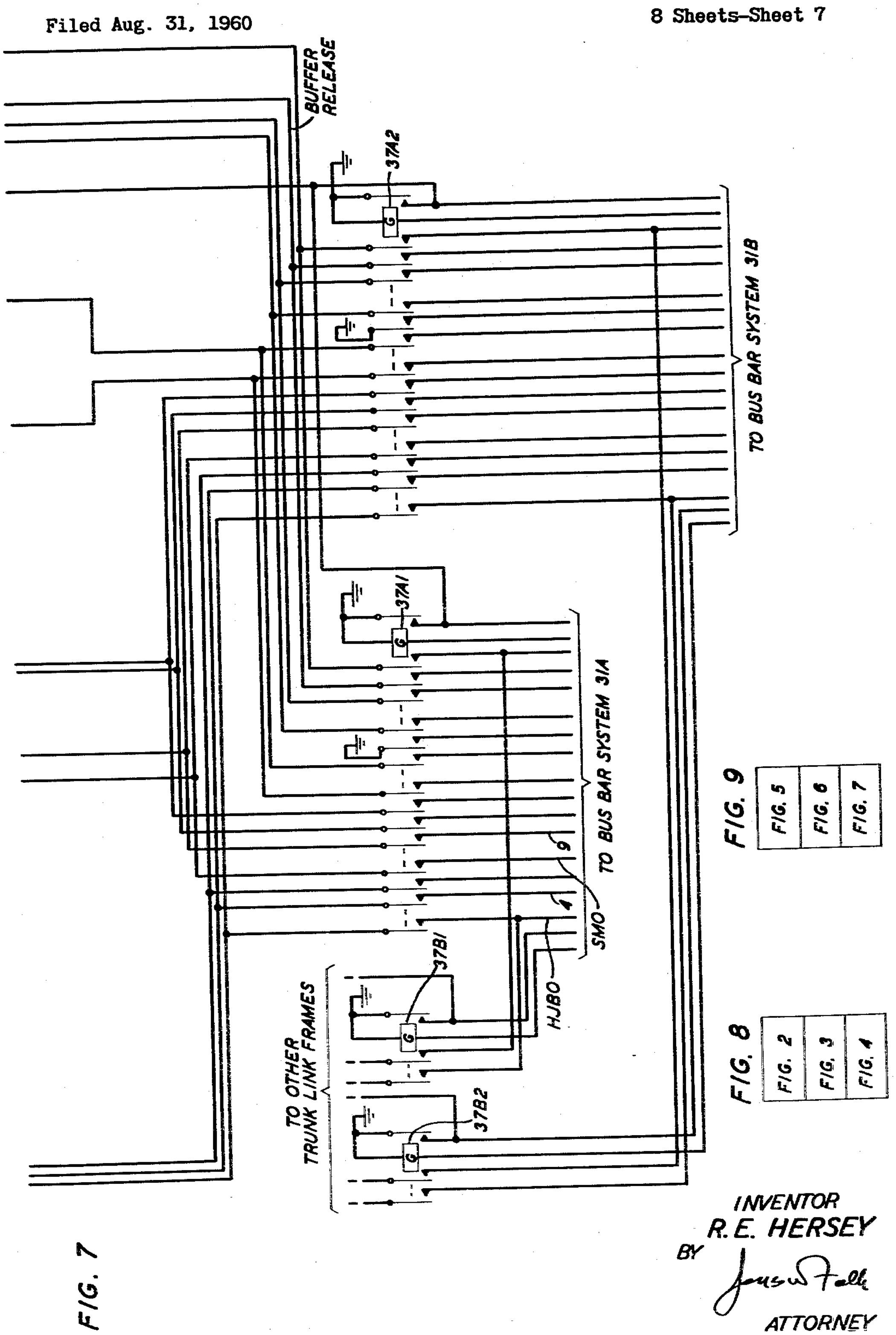
Figure 6:
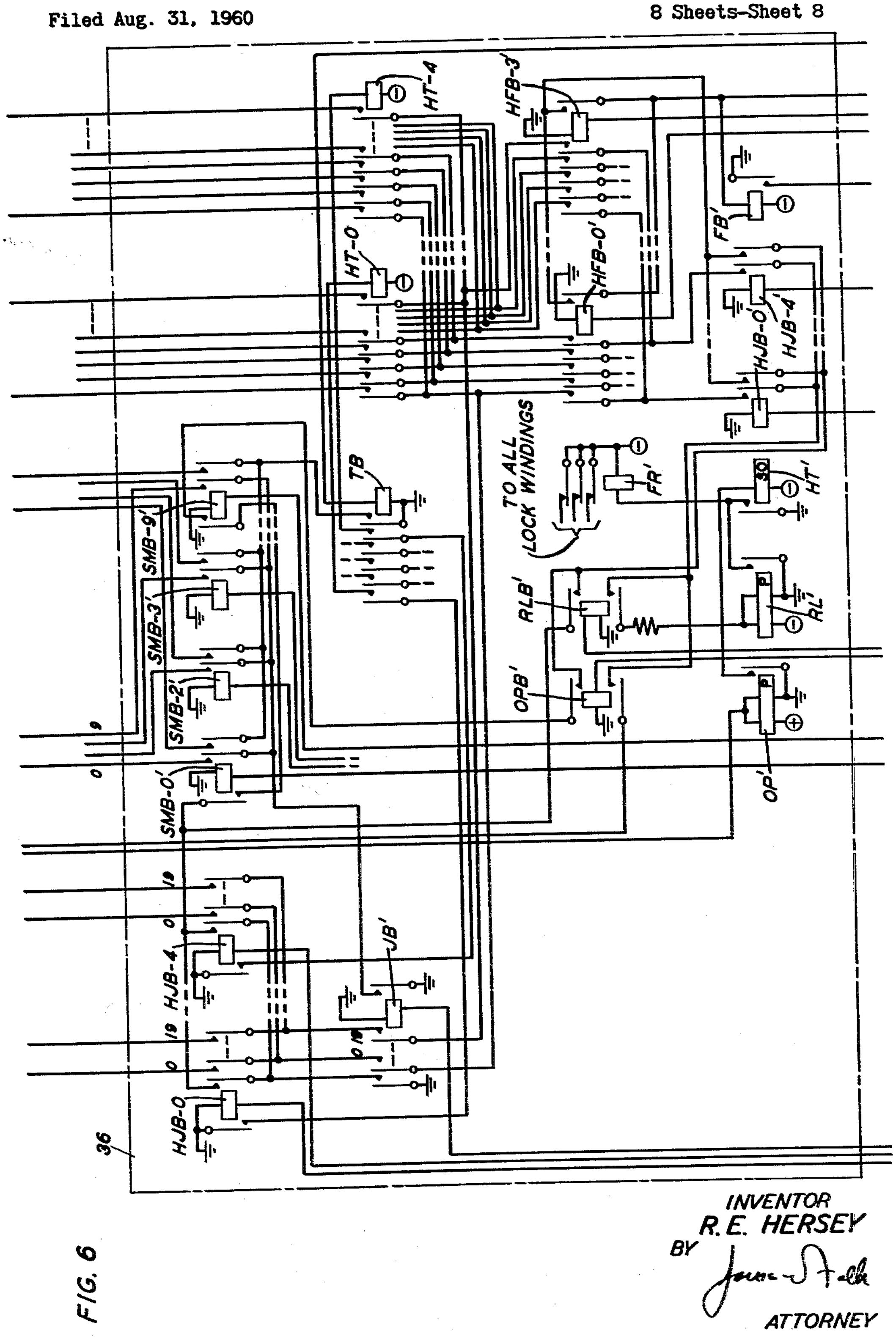

A complete understanding of this invention and of these and various other features thereof may be gained from the following detailed description and the accompanying drawing, in which:

FIGS. 1A and 1B are a block diagram of a telephone switching system in accordance with my invention indicating particularly the common bus systems and the gate and buffer relays for control of the switches of the switching network;

FIGS. 2, 3, and 4, when arranged as shown in the key diagram of FIG. 8, are a schematic representation of the buffer relays and bus system leads for one line link frame of the embodiment of FIG. 1; and FIGS. 5, 6, and 7, when arranged as shown in the key diagram of FIG. 9, are a schematic representation of the buffer relays and bus system leads for one trunk link frame of the embodiment of FIG. 1.

Turning now to the drawing, FIG. 1 is a block diagram representation of one specific illustrative embodiment of my invention. The switching network comprises a plurality of crossbar switches of a type known in the art and arranged in line link frames 10 and trunk link frames 11 interconnected as is known in the art. Twenty line link frames 10 and twenty trunk link frames 11 are indicated, but it is, of course, understood that a greater or lesser number of frames may be utilized and further that additional interconnections may be provided as desired.

Telephone sets 13 are connected by line circuits 14 to the line link frames and appropriate trunks 15, which in this embodiment are depicted as intraoffice trunks, are connected to the trunk link frames 11. The line circuits 14 and trunk circuits 15 serve both to provide connections to the terminals of the switching network and also to provide information for the central control equipment 17 which acts in response to such equipment to provide the desired telephone service. Central control 17 may advantageously be a stored program, fast electronic common control circuit, such as disclosed in Budlong-Drew-Harr Patent 2,955,165, issued October 4, 1960, and in an article "A Central Control for ESS" by G. G. Drew, vol. 38, No. 2, Bell Laboratories Record, at page 49.

Each line link frame 10 includes five levels of line switches 20 and five corresponding levels of junctor switches 21. Each line switch 20 has twenty links 23 connected to appropriate inputs of the five levels of the junctor switches 21. Each line switch 20 has twenty line circuits connected vertically. Additionally, each line switch 20 may multiple to form one to seven (or more) other line switches to provide a total of from twenty to one-hundred-sixty inputs (or more) from telephone lines for each of the five levels. In FIG. 1 these units are not separately depicted but, as described further below with reference to the detailed description of FIG. 2, in this specific embodiment of my invention it is assumed that a complement of one-hundred-sixty line inputs in each line switch 20 is utilized.

Each junctor switch 21 is a twenty-by-twenty crossbar switch split into four units, with junctors 25 extending from the outputs of each unit of each junctor switch 21 to the corresponding inputs of similar units of the junctor switches 26 of the trunk link frames 11. These junctors 25 are appropriately multipled to the other frames.

Trunk link frames 11, of which twenty are provided in this specific illustrative embodiment of my invention, each include the split trunk junctor switches 26 and five similar levels of trunk switches 27, each trunk switch advantageously comprising a single twenty-by-twenty crossbar switch.

In accordance with aspects of my invention the above-described switching network is controlled from an electronic common control 17 which applies command signals from bus control circuits 29 over a pair of line link frame bus system leads 30A and 30B and a pair of trunk link frame bus system leads 31A and 31B. These bus system leads 30 and 31 may actually be one and the same since the command signals are similar. However, the bus systems may be duplicated for reliability and to enable simultaneous connections to be set up in different parts of the switching network. Each line link frame 10 has associated with it buffer storage 32 comprising a plurality of buffer relays, as described further below. Each buffer storage 32 is selectively connected to bus systems 30A or 30B by gate relays 33 under control of gating signals applied from the central control 17 over gate control leads 35. Similarly, each trunk link frame 11 has connected thereto trunk link frame buffer storage 36 comprising a plurality of buffer relays and selectively connected to the bus systems 31A or 31B by gate relays 37 controlled by gate control signals from common control 17 over gate control leads 38.

Accordingly, each of the switches of the switching network is controlled directly by associated buffer relays in the buffer stores 33 which are in turn controlled by signals from the bus systems 30 and 31 applied through the gate relays 33 and 37. In the operation of this specific embodiment of my invention, a particular path to be established through the switching network is determined by the common control equipment 17. Signals indicative of the particular elements of the respective switches of the particular line link frames and trunk link frames which are needed to make up this path are transferred from central control and stored in the bus control circuits 29, which may advantageously comprise a plurality of flip-flop stages known in the art. When the bus control circuits 29 are set in accordance with a particular connection to be established through a portion of the switching network, the central control equipment pulses the appropriate gate control lead 35 or 38 which in turn causes the information from the bus systems to be stored in the buffer relays of buffer stores 32 and 36.

In accordance with an aspect of my invention, the gate and buffer relays have response times which are considerably less than the response time of the crossbar switches of the switching network. Further, the bus systems 30A, 30B, 31A, and 31B are disconnected from the buffer relays as soon as the latter respond to the bus signals. Thus, the central control equipment 17 and the bus systems 30 and 31 are freed to fill other service requests without being held for the relatively long period of time required for the crossbar switches of the switching network to set up a particular connection. The buffer relays thereafter function, as set forth further below, to cause the crossbar switches to establish the desired connection, after which an indication of the completion of the selection process is passed to the central control 17 and the buffer relays are released and available for establishing a different connection in that particular line link frame 10 or trunk link frame 11.

Turning now to FIG. 3, there is depicted a schematic representation of a buffer store 32 for one particular line link frame 10, shown in FIG. 2, the five levels of line switches being shown, each level being indicated as including eight units. Thus, there are depicted line switch 2000, representing the zero unit of the zero level; line switch 2007, representing the eighth unit of the zero level; line switch 2040, representing the zero unit of the fifth level; and line switch 2047, representing the eighth unit of the fifth level. The outputs of each unit at a level are connected together, but the communication connections established by the switches have been omitted from the drawing for clarity. The junctor switches 21 of this particular line link frame 10 have not been specifically depicted but it is believed that their connection to the buffer store 32 will be apparent from the following description.

In this specific embodiment of my invention two bus systems 30A and 30B are provided and the line link frame has associated with it a pair of gate relays 33A1 and 33A2, as shown in FIG. 4, one relay cooperating respectively with each bus system. Similarly, the next line link frame has associated therewith the pair of gate relays 33B1 and 33B2 for cooperation with the common bus systems 30A and 30B. Each gate relay, however, is individually controlled from the central control 17 over a gate control lead 35. Thus, gate relay 33A1 is connected to gate control lead 35A1; gate relay 33A2 to gate control lead 35A2, et cetera.

The buffer store 32 comprises a plurality of buffer relays the operating windings of which are individually connected through contacts of the gate relays 33 to individual conductors of the bus systems 30; each buffer relay winding is multipled to contacts of both gate relays 33 for that buffer store. Additionally, and in accordance with my invention, each buffer store 32 further includes relays responsive to the selective operation of the buffer relays for applying proper operate signals to the hold and select magnets of the crossbar switches.

Specifically, each buffer store 32 connected to and controlling a line link frame 10 includes eight vertical group buffer relays VGB0 through VGB7 which determine which of the eight possible units of a line switch 20 is to be employed in a given connection; ten select magnet buffer relays which are arranged in two groups, namely select magnet buffer relays SMB0 through SMB2 and SMB3 through SMB9, which buffer relays determine the particular groups of select magnets to be energized in accordance with the arrangement of the crossbar switches in this embodiment of my invention, as described further below; five horizontal group buffer relays HGB0 through HGB4, which determine the level of the line switch 20 or junctor switch 21, to be employed on the particular connection; a line buffer relay LB, which determines that the connection is to be established in the line switch of the line link frame; a junctor buffer relay JB, which determines that the connection is to be established in the junctor switch of the line link frame; four horizontal "fives" buffer relays HFB0 through HFB3; and five horizontal "units" buffer relays HUB0 through HUB4 which together determine one of twenty verticals of the line switch 20 or junctor switch 21; an operate buffer relay OPB; and a release buffer relay RLB.

Each of the above relays has its winding multipled to contacts of the two gate relays 33A1 and 33A2 for connection to the two bus systems 30; this requires that each system include thirty-six leads from common connection to all buffer stores for all the line link frames. A thirty-seventh lead is required and connected through contact G37 on the gate relays 33 directly to ground to indicate to the bus system that it may now gate the information to the buffer relays. Additionally, a thirty-eighth lead for each bus system is a buffer release lead G38 for transmitting a signal back to central control 17 on energization of the frame busy relay FB, as discussed below, thereby advising the central control that this bus system is free to pass other control signals to other line frames, as all the information for establishing the desired connection to this switch is now stored in the buffer store which, in accordance with its own wiring pattern and stored information, will then proceed to establish the connection independent of the central control.

In addition to these common thirty-eight leads for each bus system which extend to the central control 17 there are also leads individual to each buffer store for determining the selection of a particular buffer store for operation with the information on the common bus system. These individual leads include gate leads for operating the individual gate relays 33 and frame busy leads for transferring back to the central control information indicating that a particular line link frame buffer store 32 is presently busy on establishing a prior call. The frame busy signal may be transmitted by closure of contacts G39 on the gate relays, thereby applying a ground to the frame busy lead, or directly from the frame busy relay FB after release of the gate relay. If desired, the frame busy leads from a single buffer store 32 in the two bus systems 30 could be connected together.

It is to be understood, of course, that a number of relays may be employed in parallel to provide the thirty-nine contacts for the gate relays 33.

When it is desired to establish a connection through a switch in a line link frame, negative potentials are applied to one of the gate leads for the gate relays for that frame. When the gate relay has operated, closure of ground through contact G37 will indicate that negative potentials may now be applied through the flip-flops 29 to the appropriate conductors in the bus system for that gate. In response to the operation of the gate relay 33 and signals applied to the bus system 30, one relay in each of the following groups will operate: VGB0 through VGB7; SMB0 through SMB2; SMB3 through SMB9; HUB0 through HUB4; HFB0 through HFB3; and HGB0 through HGB4. Similarly, either the line buffer relay LB or the junctor buffer relay JB and either the operate buffer relay OPB or the release buffer relay RLB will operate. As soon as the last of these relays operates, a path is completed to ground from the frame busy relay FB and the FB relay operates. The path for operation of the FB relay is also extended over gate contacts G38 to the bus control circuits to indicate to central control the complete storage of the bus control signals in the buffer relays so that the bus system may be employed for other signals. In response to ground on the bus release lead at contact G38, the central control removes the negative potentials and releases the gate relay 33 and selection of the particular crosspoint elements of the crossbar switch proceeds independently under direct control of the buffer relays. However, so long as the buffer relays are operated, ground is applied, even after the opening of the gate contacts G39 when the gate relay releases, to the frame busy lead by the frame busy relay FB so that central control knows that the frame is busy and will not attempt to utilize this line link frame buffer store in establishing another connection until this use is completed.

Each of the buffer relays, which is indicated by the letter B in the relay designation, when energized by a negative potential on its associated lead in the bus system 30, operates and holds itself operated by lock-up contacts, not shown for purposes of clarity, but which contacts are connected to negative potential source 40 through contacts 41 on the frame release relay FR.

Upon operation of the various buffer relays, grounds are applied which start the independent actions leading to the operation of a particular crosspoint in a particular line switch. These actions will now be described.

The first action will be operation of the appropriate select magnets—one among the 0, 1, or 2 group and one among the 3 to 9 group. For operation in line group zero of the zero level, ground will be extended from a contact on select magnet buffer relay, e.g., SMB0 through operated relays LB and HGB0, through select magnet SM0 to negative potential. In addition this same ground will be extended to SM0 magnets on all other zero level line switches, and they will operate. Similarly, ground will be extended from the operated buffer relay in the group SMB3 through SMB9 to operate the corresponding SM3 through SM9 select magnets on all zero level line switches.

When one select magnet in each group 0–2 and 3–9 in all zero level line switches has operated, their respective contacts will close a series path which begins at positive potential 71, through the winding of OP relay 52, contacts of operated OPB relay, through the above-mentioned select magnet contacts, and continues through the operated one of hold magnet "units" buffer relays HUB0 through HUB4, the operated hold magnet "fives" buffer relay HFB0 through HFB3, and the operated vertical group relay VG0–0, through one of the hold magnet windings 50, to direct ground on its back contact. Hold magnet 50 will operate opening the direct ground and introduce a resistance ground 51 in its place.

Relay OP is a double wound polar relay, arranged as is well known in the art, with one winding connected to ground and one winding connected to positive potential with windings opposing and does not operate. When connected in circuit to a hold magnet, a bridge circuit exists. The direct ground through the hold magnet shunts the ground winding of the OP relay and prevents its operation. However, added resistance 51 shunts it insufficiently allowing relay OP to operate. This is a check that the hold magnet has actually operated. In operating, the hold magnet closes the two sets of crosspoints in the zero crossbar switch of the zero level, corresponding to the two operated select magnets SM0–2 and SM3–9. Since only one hold magnet 50 has been operated in the zero switch of the zero level of the line switches, the other operated select magnets in other switches perform no useful function at this time.

Relay OP, when operated, operates hold magnet timing relay HT which is slow operate to allow time for the magnetic structure of the hold magnet to become saturated, the material of which has sufficient permanence to magnetically latch the hold magnet after current in its winding is removed. When HT relay operates, it operates frame release relay FR, which in turn removes the locking potentials from all operated relays, all of which release. When the buffer relays release, they open the operating path of frame busy relay FB which releases, removing ground from the frame busy lead, thus indicating that the frame is again ready to accept signals from the bus systems relative to selection of another crosspoint element in any line switch or junctor switch.

Switch 2000 in FIG. 2 represents an electromechanical crossbar switch connected in accordance with an aspect of one specific embodiment of my invention. This diagram is similar to FIGS. 9–26 on page 198 of "The Design of Switching Circuits" by Keister, Ritchie, and Washburn (D. Van Nostrand Company, 1951) but differs in that the switch of this embodiment is advantageously connected to provide additional output leads over those provided by the switch represented by FIGS. 9–26. As depicted a crossbar switch of a type known in the art is shown having pluralities of contacts arranged in ten horizontal rows, or levels, and twenty vertical columns, of which certain ones have been omitted from the drawing for simplicity. Associated with the respective horizontal rows are the select magnets SM0 through SM9, while the hold magnets H0 through H19 are arranged with the corresponding columns, or vertical groups. Each vertical group associated with a particular hold magnet comprises six vertical multiple straps divided into three groups of two straps each, of which only one vertical strap is depicted for each column, such as straps 60, 61, and 62.

In conventional fashion each plurality of contacts, such as contacts 64, 65, and 66, situated at the intersection of a particular horizontal row and vertical column is closed by energizing in sequence a corresponding select magnet and a corresponding hold magnet, in this case select magnet SM2 and hold magnet H0. The select magnets are arranged by pairs, each pair being associated with a corresponding rocker bar, and those in a given pair are energized alternatively. For example, appropriate control signals will operate either SM0 or SM1, SM2 or SM3, et cetera.

In accordance with an aspect of my invention, the individual contacts of the crossbar switch 2000 having six contact pairs at each coordinate position are interconnected to provide twenty input terminals and twenty output terminals for two-wire operation. Connections to certain of the contacts of the different levels of the switch are shown as representative of the manner in which the complete switch is arranged. It will be noted that the arrangement of connections of contacts in the lower three levels is different from that of contacts in the upper seven levels. Accordingly, a current path is provided through the switch between predetermined input and output terminals by energizing one select magnet in each of the groups SM0 through SM2 and SM3 through SM9 and one of the hold magnets H0 through H19. To illustrate, let us suppose that a connection is to be made between the input 0 and the output 19. Select magnets SM2 and SM9 and the hold magnet H0 are energized. As a result, more contacts than will be used in the connection are closed, but the current path from input 0 to output 19 will include the contact 66; the vertical multiple strap 62, and the contact 67.

The foregoing description relates to the operation of a particular crosspoint in a line crossbar switch of the line link frame and would be equally applicable to a line junctor crossbar switch by substituting the junctor buffer relay JB for the line buffer relay LB, which in turn permits operation of horizontal group relays HG0–HG4 corresponding to operated buffer relays HGB0–HGB4. Vertical group buffer relays VGB0–VGB7 and corresponding VG relays will not be operated for the line junctor switch function; then there will be no operating paths to any line switch for select or hold magnets. However, select and hold operating paths will be extended through the JB and HG0–HG4 relays to junctor switches whose operation follow, just as described for a line switch.

Similarly, release of a crosspoint is effected when the release buffer relay RLB is energized instead of the operate buffer relay OPB. In the case of crosspoint release, negative potential 70 is applied to the hold magnet 50 rather than the positive potential 71 and the release relay RL operates instead of the operate relay OP to indicate that the hold magnet 50 has released. Operation of the release relay RL applies ground directly to the frame release relay FR, the time delay provided by relay 53 being unnecessary during release of a hold magnet 50 since no soaking current is required. In all other respects, the operation of the relays depicted in FIG. 3 is the same for crosspoint release as for crosspoint operation and for control of a crosspoint in a junctor switch as for a crosspoint in a line circuit except that it is unnecessary to operate select magnets for the release function but does no harm to do so.

In FIGS. 5, 6, and 7 an arrangement similar to that of FIGS. 2, 3, and 4 is depicted for control of the junctor and trunk switches 26 and 27 within a trunk link frame 11. Central control operates a particular gate relay 37 which applies the signals from the selected bus system 31A or 31B to the respective buffer relays; relays having similar functions in the trunk buffer store 36 to those described with respect to the line buffer store 32 are similarly designated but primed, e.g., junctor relay JB′.

Inasmuch as operation of crosspoints in the switches of the trunk link frame correspond exactly to operation in the line link frame, the trunk link frame gate relays, buffer storage relays, and other functions, respond to signals passed to the bus systems serving the trunk link frames exactly as described above for the line link frames, with two exceptions: (*a*) there are no additional trunk link switches multipled to the one and only trunk link switch on each level; (*b*) inasmuch as there are no added trunk link switches, similarly numbered select magnets are multipled together on the five switch levels instead of on one level.

For these reasons it is unnecessary to provide vertical group relays. The different levels of the trunk link frame are selected by the HT0–HT4 relays in cooperation with the trunk buffer relay TB. The different horizontal levels of the trunk junctor switches are selected by the HJB0–HJB4 relays in cooperation with junctor buffer relay JB′. Otherwise the operating paths and release paths of the hold magnets on these switches start at positive potential through the OP′ relay, and negative potential through the RL′ relay, respectively, and continue to the chosen hold magnet through HUB′ and HFB′ relays just as previously described for the line link frame.

There being no vertical group relays, there are only twenty-eight buffer relays instead of thirty-six as in the line frame. Inasmuch as these twenty-eight relays correspond to the twenty-eight functions, other than vertical group, in the line frame, it should be noted that the trunk link frame buffer relays may be associated with the same bus systems used for the line link frames if desired, eliminating bus systems 31A and 31B, but only two elements of the connection could be set up simultaneously.

To summarize the operation of this invention reference is again made to FIG. 1, and the steps in setting up a call between telephone sets 13*a* and 13*b* will be described.

When the handset of the telephone set 13$a$ is picked up, the associated line circuit 14 detects the change of switch-hook condition and sends an appropriate signal, together with identification of the telephone line associated with set 13$a$, to the central control equipment 17. In response to this information the central control equipment 17 selects an originating register 80 and determines the elements of the crossbar switches which are free to provide a path between the telephone line and the selected originating register 80. It then sets the bus control circuits 29 in respective states to apply appropriate control signals to the common leads of bus systems 30 and 31. The central control equipment 17 also energizes appropriate gate relays 33 and 37 to connect the particular buffer stores 32 and 36 to the energized bus systems 30A or 30B and 31A or 31B.

Let us suppose that the first connection to be established is located in the crossbar switch 20 of the nineteenth line link frame 10. The corresponding LLF buffer relays 32 will be connected to the energized bus leads of one of the systems 30A or 30B. Central control 17 being very fast may a moment later activate bus system 30B or 30A for operate or release of some other line frame. At the same time signals from the bus control circuit 29 are passed over the common bus leads through the energized gate relay 33 to the LLF buffer relays 32 where they energize selected ones of these buffer relays in accordance with the pattern established by the central control equipment 17. When these buffer relays 32 respond in accordance with this pattern, a signal indicating this response is passed back to the central control equipment 17 which thereafter releases the previously operated gate relay 33. The LLF buffer relays 32 thereupon proceed to energize the selected connection within the crossbar switch 20, while the bus control circuits 29 and the bus systems 30A or 30B are free to perform corresponding path selection functions for other switch frames. For example, an additional element of the path may now be established in the manner described, within the junctor switch of the same line link frame, although this element could have been set up by the other bus system 30B or 30A either before or after the line link element, or a portion of a different path may be established through another line link frame 10.

There being separate bus control circuits for each bus system 30A, 30B, 31A, and 31B, central control 17 may, if action on some other call is not needed, set bus systems 31A and 31B almost simultaneously with setting bus systems 30A and 30B for the trunk link switch and trunk junctor switch control needed for this call.

Eventually the desired path is established between the telephone set 13$a$ and the selected originating register 80 which returns dial tone and records the dialing information received from the telephone set 13$a$. Upon completion of dialing, this information is sent to central control equipment 17 which thereafter acts to disconnect the originating register 80 from the telephone set 13$a$ and to set up paths which will connect the telephone sets 13$a$ and 13$b$. These paths are established between each of the telephone sets 13 and a selected intraoffice trunk circuit 15 in the manner already described relative to the path between the telephone set 13$a$ and the originating register 80. Thus, it can be seen that this invention advantageously provides a simple and desirable arrangement which combines the reliability and economy of mechanical crossbar switches in a switching network controlled by high speed electronic central control equipment generating control signals of a time duration which is significantly disparate from the response times of the crossbar switches.

It is to be understood that the above-described arrangements are illustrative of the principles of the invention. Numerous other arrangements may be devised by those skilled in the art without departing from the spirit and scope of the invention.

What is claimed is:

1. In a telephone system, a telephone switching network comprising a plurality of first electromechanical switching means having a relatively long response time, said first electromechanical switching means being arranged by groups for establishing preselected paths through said network, equipment for selecting said paths in accordance with customer requests, said equipment including a source of control signals of substantially shorter duration than the response time of said first electromechanical switching means, means for directing said signals collectively to a plurality of said groups, second electromechanical switching means individually associated with said groups for actuating said first electromechanical switching means in accordance with said control signals, and means for selectively connecting said second electromechanical switching means to said signal directing means.

2. In combination, a telephone communication network comprising first electromechanical switching means interconnected to form path links within said network, electronic central control equipment including means for selecting certain of said links to determine a particular communication path, means for temporarily storing signals from said central control equipment in order to control said first electromechanical switching means, common signal carrying means connected to said central control equipment, and gating relay means for selectively connecting said signal storing means to said signal carrying means.

3. The combination in accordance with claim 2 wherein said signal storing means comprises a plurality of electromechanical relays having a short response time for energizing pulses.

4. The combination in accordance with claim 2 wherein said first electromechanical switching means comprises a crossbar switch.

5. A telephone communication network in accordance with claim 4 wherein said crossbar switch comprises means for maintaining its contacts closed after the termination of the energizing signals from said temporary storage means.

6. The combination in accordance with claim 4 wherein said crossbar switch comprises a plurality of vertical conductors, first and second groups of horizontal levels of contacts, said first group comprising three horizontal levels of contacts and said second group comprising seven horizontal levels of contacts, means interconnecting particular ones of said contacts within their respective groups in order to define input and output terminals in said switch, and means for selectively controlling one level of each of said first and second groups and one of said vertical conductors in order to establish a predetermined connection between a particular input terminal and a particular output terminal.

7. The combination in accordance with claim 2 further including means for releasing said gating relay means on the storage of signals from said common signal carrying means in said signal storing means.

8. The combination in accordance with claim 7 wherein said signal storing means comprises means for maintaining a temporary storage state after said gating relay means is released.

9. The combination in accordance with claim 8 wherein said signal storing means further comprises means for restoring the quiescent state thereof upon the energization of said first electromechanical switching means in response to the signals temporarily stored in said signal storing means.

10. The combination in accordance with claim 2 wherein said common signal carrying means comprises two bus systems of conductors connected between said central control equipment and said gating relay means.

11. A telephone switching system comprising a network comprising a plurality of first electromechanical switching devices having a predetermined range of signal response times and arranged in groups for providing selected communication paths through said network, means for determining a desired one of said communication paths including a source of signals of substantially shorter duration than said range of signal response times, common circuit means for directing said signals to said groups, a plurality of second electromechanical devices in each of said groups, means for controlling selectively those second electromechanical devices in a preselected group in accordance with signals from said signal source including means for connecting said second electromechanical devices in said preselected group to said common circuit means, means for disconnecting said second electromechanical devices in said preselected group from said common circuit means upon completion of the selective control of said last-mentioned devices in accordance with said signals, means including said second electromechanical devices for controlling said first electromechanical devices to establish said desired path, and means for restoring said controlled second electromechanical devices to their initial states upon the establishment of said desired path.

12. In a telephone switching system, a switching network comprising a first plurality of electromechanical crosspoint elements arranged in coordinate arrays and interconnected by groups, central control equipment common to more than one of said groups for producing control signals of substantially shorter time duration than the response times of said electromechanical crosspoint elements, means individual to one of said groups for selectively controlling the state of said electromechanical crosspoint elements therein comprising second electromechanical means having shorter response times than those of said electromechanical crosspoint elements, means for connecting said second electromechanical means of a selected one of said groups to said means common to more than one of said groups, and means for interrupting said connection upon the establishment within said second electromechanical means of conditions corresponding to the states of said central control equipment.

13. A telephone switching system comprising a switching network including a plurality of crossbar switch means arranged in line link frames, each line link frame including a plurality of line switch elements arranged in an ordered array and a junctor switch element corresponding to each order of said array, buffer relay means for each of said line link frames, at least one bus system including a plurality of conductors, gate relay means for individually connecting each of said buffer relay means to said bus system, central control means for applying control signals selectively to certain of said conductors in accordance with the crosspoint to be closed in said crossbar switch means, means for individually operating the gate relay means for the line link frame in which said crosspoint is located, and means responsive to operation of said buffer relays for subsequently operating said crossbar switch means independent of said central control means.

14. A telephone switching system in accordance with claim 13 further comprising means for signaling said central control over one of said conductors to release said gate relay means and said bus system after operation of said buffer relays and means individual to each of said buffer relay means for signaling said central control that said buffer relay means is establishing a connection through said crossbar switch means.

15. A telephone system in accordance with claim 14 wherein said buffer relay means include means for determining the operation of a line or junctor switch in a link frame and for operating or releasing said crossbar switch means in said link frame.

References Cited in the file of this patent

UNITED STATES PATENTS 2,872,527 Bray et al. ---------------- Feb. 3, 1959